United States Patent [19]

Lankheet

[11] 4,267,142

[45] May 12, 1981

[54] REINFORCED RESIN MOLDING METHOD AND APPARATUS

[76] Inventor: Jay A. Lankheet, 1329 Bayview Ave., Holland, Mich. 49423

[21] Appl. No.: 87,008

[22] Filed: Oct. 22, 1979

[51] Int. Cl.³ .............................................. B29D 9/04
[52] U.S. Cl. .................................... 264/510; 264/102; 264/316; 264/511; 264/552; 264/553; 264/571; 425/338
[58] Field of Search ............... 264/102, 510, 511, 552, 264/553, 571, 314, 316; 425/388, 389

[56] References Cited

U.S. PATENT DOCUMENTS

| | | | |
|---|---|---|---|
| 2,794,756 | 6/1957 | Leverenz | 264/510 |
| 3,140,325 | 7/1964 | Graff | 264/510 |
| 3,467,741 | 9/1969 | Kesling | 264/510 |
| 3,982,877 | 9/1976 | Wyeth et al. | 425/388 |

Primary Examiner—Donald E. Czaja
Assistant Examiner—W. Thompson
Attorney, Agent, or Firm—Price, Heneveld, Huizenga & Cooper

[57] ABSTRACT

The specification discloses an apparatus and method for molding glass fiber reinforced polyester resin articles. A bladder-covered male mold is in turn covered with resin and reinforcement and a female mold with a surface forming film located therein or with a smooth surface is then closed over the male mold. With the bladder held against the male mold by vacuum, air is evacuated from between the bladder and the female mold. The vacuum between the bladder and the male mold is then released whereby the bladder is forced against the resin to thereby force it against the film which is located within the female mold or against the mold surface. This insures a molded article with a bubble free surface. Where a film is used, this insures a tight air free bond between the resin and the film.

22 Claims, 8 Drawing Figures

REINFORCED RESIN MOLDING METHOD AND APPARATUS

BACKGROUND OF THE INVENTION

The present invention relates to forming molded glass fiber reinforced polyester articles, particularly panel-shaped articles such as swimming pool walls and the like. Such articles typically have a smooth, plastic skin or film which defines the exterior shape of the article. Alternatively, a very smooth mold surface is provided against which the resin is cast. Glass fiber cloth saturated with resin is then layed against the film or smooth or intentionally textured mold wall and more resin is painted or rolled into place. Alternatively, a mixture of resin and chopped glass is sprayed onto the film. Sometimes, a combination of both processes are used.

Unfortunately, it is very difficult to prevent the formation of air bubbles between the polyester resin layer and the surface film or the mold surface. It is also difficult to achieve a complete bond, and delamination sometimes results.

There is also a significant environmental problem involved in these prior art techniques. The vapors of the solvent used to carry the polyester resin readily escape into the working environment when one is painting or spraying the resin in place. If at all possible, this condition should be avoided. Fumes tend to be particularly bad in spraying operations.

Further, even when you spray the resin onto this film, you usually have to use a roller to try to roll out air bubbles and insure a tight fit.

Another type of molding is known as bag forming. After resin is located in a female mold, a flat bladder is sucked down against the resin surface to squeeze the resin against the female mold. However, this method has been particularly unsuccessful in connection with larger articles, such as large panels of the type used in swimming pool walls, and with reinforced resins. There are simply too many air bubbles which are not eliminated through the use of this method. When air is removed from the mold, resin is also removed. Further, it is extremely difficult to keep reinforcing ribs which might be placed against the film from shifting around as the bladder is drawn up against the resin.

Yet another alternative is to provide matching male and female metal molds. The polyester resin and chopped glass are then injected into the mold cavity under a relatively high pressure, i.e. 20–30 psi. Unfortunately, the mold for such a process is extremely expensive. It becomes particularly costly when the molded article has to be provided with undercuts.

SUMMARY OF THE INVENTION

In the present invention, polyester resin (typically with some form of glass reinforcement) is placed on a configurated flexible bladder or inside of the opposite mold. The bladder is held against a mold member by means of a vacuum which is applied between the bladder and the mold. Mold halves are closed and a vacuum is applied in the space occupied by the resin, the vacuum between the bladder and the first mold is simultaneously maintained, to thereby draw air out of the space between the polyester resin and mold surface or a film or the like which may be placed on the mold surface. The vacuum between the bladder and the first mold is then released and the resulting pressure differential forces the bladder tightly against the resin and reinforcement, which in turn forces the resin and reinforcement tightly against the mold surface or film or the like.

As a result, air bubbles at the resin surface are substantially eliminated. A tight bond which is very resistant to delamination is created between the resin and any film which may be used. This can be achieved with relatively low mold clamping pressures, i.e. 0 to 5 psi. Further, except for the lay-up operation, the operation takes place between closed mold halves, thereby decreasing the problem of freely escaping solvent fumes. Finally, while one could use a spray system to spray the resin onto the bladder, it is absolutely unnecessary to do so since spraying is normally used as a means for trying to avoid air bubbles at the resin surface. By avoiding spray operations, one further minimizes the problem of freely escaping solvent fumes.

These and other objects, advantages and features of the invention will be more fully understood and appreciated by reference to the written specification and appended drawings.

DESCRIPTION OF THE PREFERRED EMBODIMENT

Figure 1:
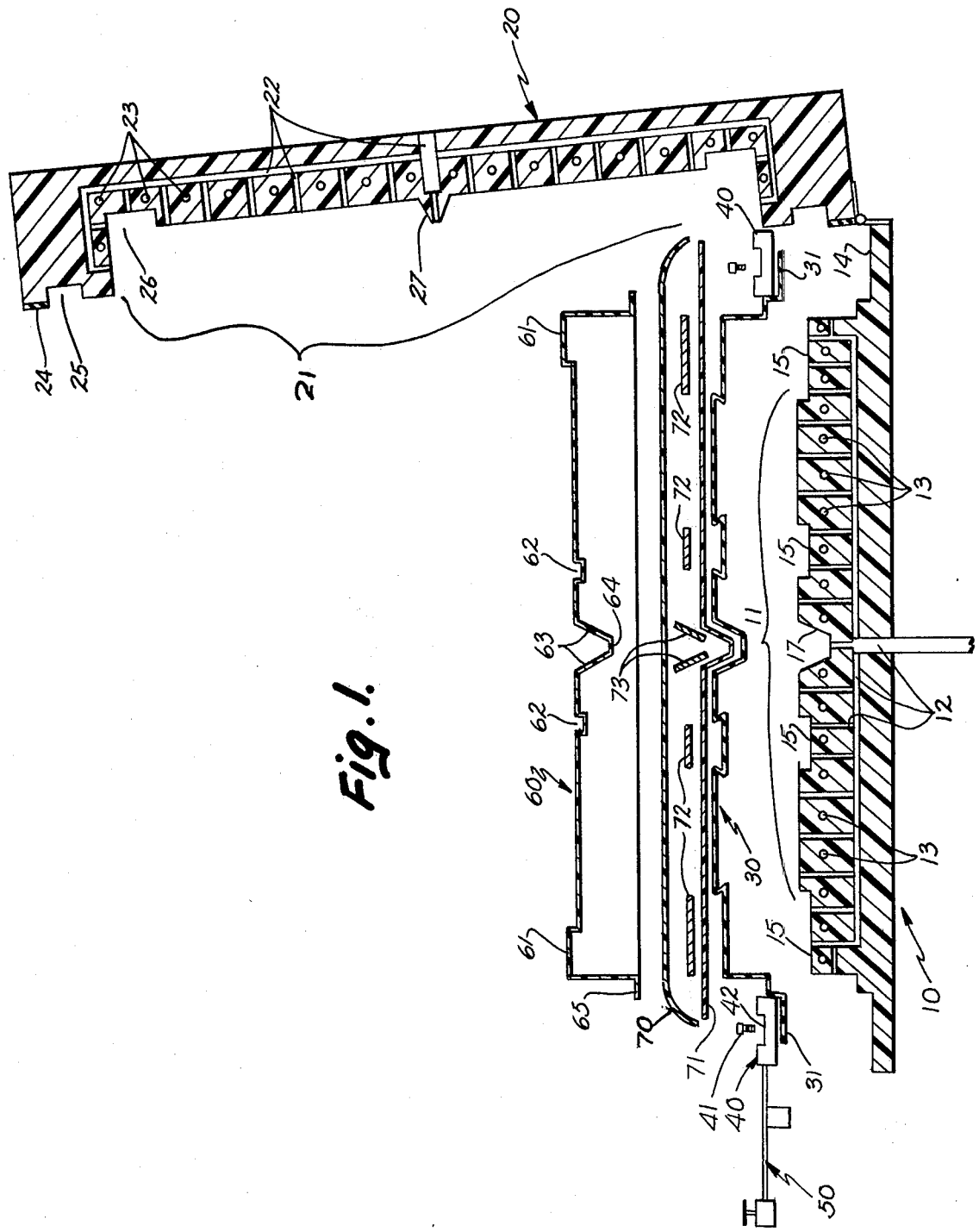
FIG. 1 is a cross-sectional view showing the male and female molds employed in the present invention as well as the various components which are sandwiched therebetween.

In the preferred embodiment, bladder 30 is formed over the core 11 of male mold 10 and is clamped in place by perimeter clamps 40 (FIG. 1). A vacuum is maintained between bladder 30 and mold half 10. A plastic film 60 is located within the core 11 of female mold half 20. A layer of resin impregnated glass cloth 71 is placed over bladder 30. Reinforcing ribs 72 and 73 are then placed at appropriate points on impregnated glass cloth layer 71. A top layer of resin impregnated glass cloth 70 is layed over ribs 72 and 73. Female mold half 20 is then closed.

The mold halves 10 and 20 are then closed and while the vacuum is still maintained on bladder 30, a second vacuum is drawn through exterior vacuum line 50 to create a vacuum in the space between surface film 60 and bladder 30. This begins drawing air out of that space. Thereafter, the vacuum lines 12 though male mold 10 are opened to a source of positive pressure (relative to the vacuum the exterior line 50) whereby bladder 30 compresses the resin and reinforcement layer tightly against film 60.

The pressures utilized in the present method are relatively low compared, for example, to injection molding pressures. Only sufficient clamping pressure has to be placed on molds 10 and 20 to create a seal at the perimeter thereof. In many instances, no clamping pressure will be necessary. Thus both mold halves 10 and 20 can be fabricated relatively inexpensively. It is important that they have sufficient thickness and strength to allow the user to draw about 25 p.s.i. vacuum between them.

Preferably, mold halves 10 and 20 are made of plastic with their respective core and cavity shaped according to a pattern. Of course, it will be appreciated by those skilled in the art that mold halves 10 and 20 could be made of metal and could be machined to a desired configuration. However, it is believed that making them of plastic and using a pattern to shape the core and cavity is relatively more economical. Alternative mold halves 110 and 120 are made of a combination of metal, plastic, wood and rubber (FIGS. 5-8).

Male mold 10 is formed with vacuum lines 12 extending to the surface of core 11. Hot water ducts 13 extend through the body of core 11 so that hot water can be pumped therethrough to help cure the article formed in the mold. Male mold 10 terminates in a relatively flat perimeter flange 14.

The surface of core 11 is, in the preferred embodiment, configured to correspond generally to the configuration of the surface which, in this case, is the rear surface, of the article being formed. It does not have to be identical to the configuration of the rear surface since the shape of bladder 30 ultimately determines the final shape of the rear surface.

By making the surface of core 11 conform generally to the rear surface of the article, it is possible to utilize a configurated bladder, as opposed a simple, planar sheet. That is because the configuration of the male core 11 helps to prevent the configured portions of bladder 30 from shifting out of position or from distorting during the molding operation.

On the other hand, because the surface of core 11 does not have to be identical to the configured article, one can avoid serious undercutting problems. If the rear surface of the article is to have undercuts, as is the case with respect to the article being produced in FIG. 1, the undercuts can be formed in the bladder 30 but do not have to be formed in core surface 11. This eliminates the need to provide core 11 with complicated cams for purposes of shaping an undercut and still making it possible to withdraw the article from the mold.

As shown in FIG. 1, core 11 includes rib recesses 15 which are designed to form ribs on the rear surface of the article. Similarly, a "V" 17 is formed in the center of core 11 to create a projection in the rear surface of the article being formed.

Female mold 20, as shown in FIG. 1, also includes vacuum lines 22. These enable one to hold film 60 in place within female mold cavity 21 while female mold half 20 is being closed. However, vacuum lines 22 would not be utilized if film 60 were formed by coating the interior of cavity 21 with gel coat or some other resinous material. In that case, one would have to either mechanically hold film 60 in place, or alternatively, close male mold 10 onto female mold 20. Also in that case, the resin impregnated glass cloths 70 and 71 and the ribs 72 and 73 would have to be placed into film 60 rather than being placed over bladder 30.

Mold 20 also includes hot water pipes 23 located near the surface thereof generally throughout cavity 21. As with pipes 13 in male mold 10, these facilitate curing the article.

The surface of core 21 corresponds to the surface, in this case the front surface, of the article being formed. As shown in FIG. 1, the article being formed comprises two swimming pool walls.

Referring to film 60 which defines the front surface of the two walls, it will be seen that at each side thereof there is a coping 61 which is intended to be located at the top of the wall when the swimming pool wall is installed. Towards the bottom of each of the two walls is a liner securing groove 62. When the wall is installed, a bead on a liner will be located within groove 62 to thereby hold the bottom liner to the pool wall. Then, each wall slopes downwardly and inwardly at bottom flange 63. The two walls can be cut apart along the bottom separation flat 64. A perimeter flange 65 extends around the perimeter of film 60 and it will ultimately be trimmed off, if not before molding the article, then after.

The surface of female mold cavity 21 accordingly includes a coping forming deviation 26 for each coping 61 and a central projection 27 which projects into the "V" notch defining surfaces 63 and 64 on film 60. There are no projections corresponding to sealing groove recesses 62 since metal extrusions are located therein during the molding process. The metal extrusions form appropriate lips for catching and holding a liner bead in place within the grooves 62.

At the perimeter of female mold 20, there is a sealing material 24 defining a perimeter seal. Immediately there adjacent is an upside down channel 25 which creates a vacuum passage around the perimeter of female mold 20. This facilitates drawing the vacuum in the space between film 60 and bladder 30.

Bladder 30 comprises a flexible rubber or rubber-like membrane with a thickness of approximately 1/16 to about ⅛ inch. Preferably, it is formed by first putting a release agent on mold core 11, and then painting several layers of a liquid latex or silicone rubber material onto core 11. Preferably, pieces of polyester stretch cloth, of the type used in ladies' girdles or bathing suits, for example, are incorporated into bladder 30 by placing them at various points over a dried layer of liquid latex or silicone rubber, followed by painting additional layers over the top of the cloth.

In order to form the undercuts 33 along the edges of rib deviations 32 (see FIG. 3), one places a dummy rib against the sidewall of rib recess 15 in mold core 11. This dummy rib has the desired undercut configuration and can be temporarily glued to core 11 at an appropriate point. After bladder 30 has cured, it is peeled off of core 11 and the dummy ribs are removed.

Figure 2:
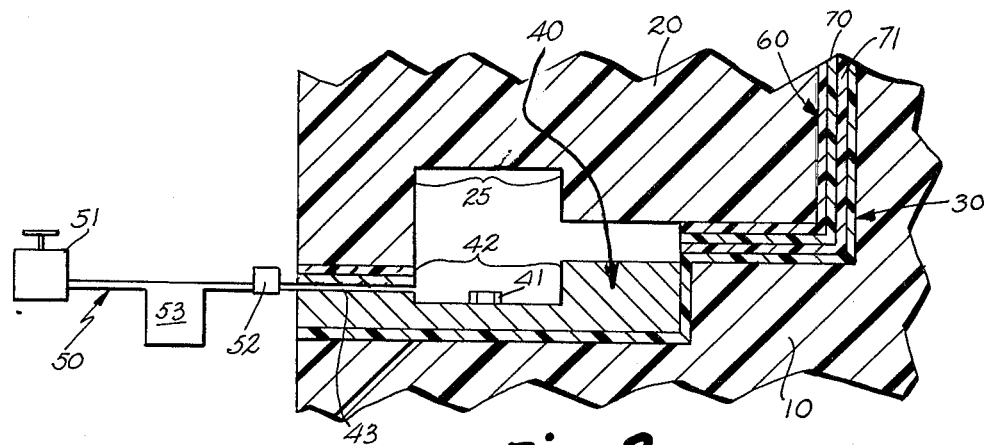
FIG. 2 is a cross-sectional view showing the seal at the perimeter of the male and female molds.

Bladder 30 is provided with a perimeter flange 31 (FIG. 1). It is this perimeter flange 31 which is clamped and glued between the perimeter flange 14 of male mold 10 and the perimeter clamps 40. Perimeter clamp 40 is preferably formed of steel. It includes a channel-like trough 42 therein which serves to collect excess resin and which, along with the inverted channel 25 in female mold 20 serves as a vacuum passageway around the perimeter of mold halves 10 and 20. Clamp 40 is bolted to flange 14 by means of a plurality of spaced clamping bolts 41 (FIGS. 1 and 2). There is also a vacuum line 43 through at least one of the perimeter clamping blocks 40 whereby the external vacuum line 50 can be fitted thereto by means of a suitable fitting 52. Through the operation of valve 51, one can draw a vacuum through line 43 or one can release the vacuum. A resin overflow container 53 is provided along line 51 so that if trough 42 fills up with resin, it will be drawn out through line 43 and into container 53 before being drawn through valve 51.

Once bladder 30 has been formed and clamped in place by clamps 40, it is coated with a suitable mold release agent. Glass cloth 71 is impregnated with resin in a conventional manner. Glass cloth 71 is preferably of the continuous fiber mat type so that it has a "fuzzy" surface. This contributes to its reinforcing function.

Ribs 72 and 73 are then located in their appropriate position as indicated in FIG. 1. These reinforcing ribs can be made of particle board, plywood, fiber board or any other suitable stiffening material.

Another sheet of glass cloth 70 is then impregnated the same way as glass cloth 71 and is laid over the top of ribs 72 and 73. The resin from the two layers of glass cloth 70 and 71 tends to flow together to create an integrated resin and glass cloth layer. Hence, in FIGS. 3, and 4 the two layers of glass cloth 70 and 71 and whatever space exists therebetween are cross sectioned in the same direction as an integrated layer surrounding reinforcing ribs 72.

A suitable release agent is placed on the interior surface of mold cavity 21 and female mold 20. Then surface film 60 is placed in mold cavity 21. Surface film 60 can be a vacuum formed acrylic sheet, in which case, a vacuum is applied to vacuum lines 22 of female mold half 20 to hold film 60 in place while the female mold half 20 is closed. Alternatively, film 60 can simply be a gel coat or other resin material painted onto the interior surface of mold cavity 21, in which case no vacuum lines 22 would be present. The openings of the vacuum line to the surface would destroy the smooth surface of the film 60. As noted above, one would have to employ mechanical means to hold film 60 in place while one closed mold half 20. Alternatively, one could modify the process somewhat, as explained herein below, and close male mold 10 on female mold 20.

Figure 3:
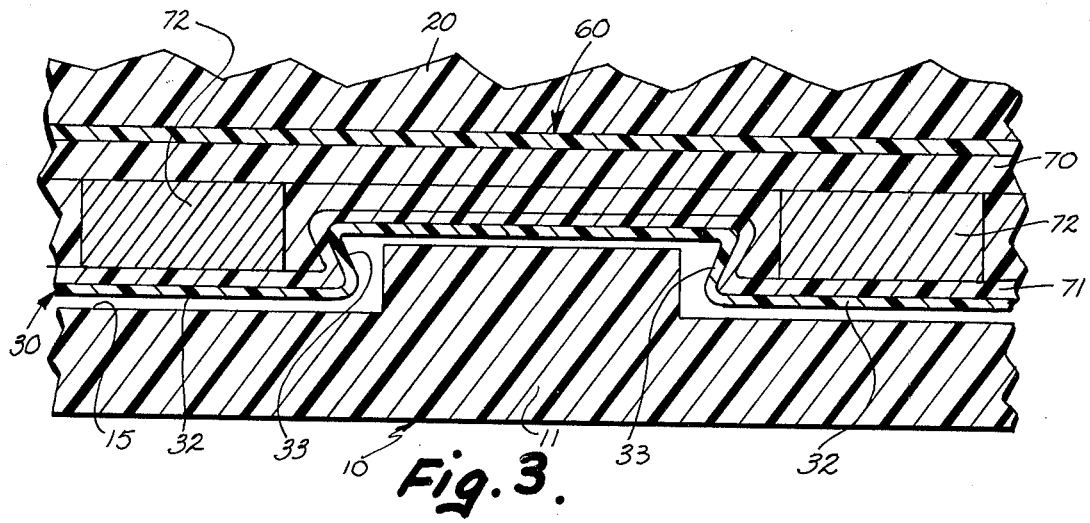
FIG. 3 is a cross-sectional view showing the bladder expanded against the resin to create an undercut in the finished product.
Figure 4:
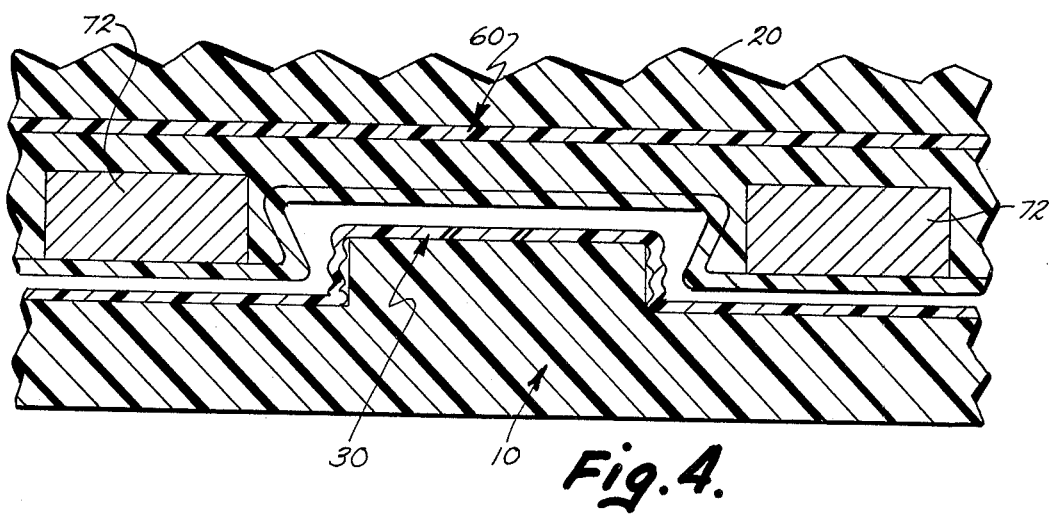
FIG. 4 is a cross-sectional view showing the manner in which the bladder can be withdrawn from the finished article to allow one to remove the undercut without the use of cams in the mold.

Once film 60 is in place, mold half 20 is closed. A vacuum is drawn on bladder 30. Then, a vacuum is drawn through vacuum line 50 and vacuum line 43 around the perimeter of mold halves 10 and 20. This creates a vacuum in the spaced between film 60 and bladder 30. With bladder 30 also held against male mold 10, this vacuum tends to draw air from the space between film 60 and bladder 30. After vacuum 50 has been on long enough for the vacuum to reach approximately 20 to 25 inches of mercury, a matter of only 5 to 25 seconds depending on the part size, the vacuum lines 12 in male mold 10 are opened to the atmosphere or some other source of positive pressure relative to the vacuum being drawn through exterior vacuum line 50. This causes bladder 30 to press against the resin and reinforcement layer and pushes the same into its final desired configuration. Also, the resin layer is pushed against film 60 to help create a tight bond therebetween. The pressure also causes the undercuts to be formed in the rear surface of the molded pool wall as shown in FIG. 3. Then hot water is circulated through pipes 13 and 23 respectively, to facilitate the curing of the molded pool wall.

Once the pool walls are cured, the vacuum 50 is shut off. Also, a vacuum is again drawn through vacuum lines 12 so as to draw bladder 30 tightly against the surface of male mold 10 (see FIG. 4). This draws the bladder undercut portions 33 away from the undercut in the resulting pool walls and enables one to readily remove the cured, molded pool walls from male mold 10. Similarly, the skin 60 which is now tightly adhered to the resin and reinforcement layer is readily released from the interior of mold cavity 21. Curing time can vary greatly depending on the resin mix, but is typically 5 to 15 minutes.

As described, the resin and reinforcement layer was applied over the top of bladder 30. However, the process could be reversed and with female mold half 20 lying flat with its cavity 21 facing upwardly, the various layers of impregnated glass cloth and the reinforcing ribs could be placed within and against skin 60 located in mold cavity 21. Male mold 10 with bladder 30 held in place by a vacuum would then be closed down onto female mold 20.

In yet another variation of the process, the article being formed might be such that one would want the smooth film 60 to correspond to the configuration of the male mold 10. The process can be readily reversed to accommodate this variation. One would form bladder 30 to conform generally to the configuration of the cavity 21 of female mold 20. Bladder 30 would be held against mold cavity 21 and film 60 would be held against male mold 10.

As disclosed in the preferred embodiment, the process is particularly desirable in that one not only achieves a tight, bubble free bond between the resin layer and the plastic film 60, but one also minimizes solvent evaporation into the factory work area. The impregnation of the glass cloth can be accomplished within a relatively closed environment. The only time the glass cloth really has to be exposed to the surrounding atmosphere is when it is transferred from the impregnating rollers to the mold. Once the mold is closed, fumes are withdrawn through vacuum line 50 and can be properly handled without flooding the factory area.

Of course it will be appreciated that the invention can be practiced using various other methods for applying the resin and reinforcement layer. For example, one could refrain from using glass cloth altogether and spray a mixture of resin and chopped glass onto either bladder 30 or film 60. Reinforcing ribs 72 and 73, if employed, could be placed in position between successively sprayed layers. However, the use of such a spraying method is not in accordance with the most preferred aspect of the invention and hence does not enable one to enjoy the full benefits which can be achieved by the present invention.

Also, resin can be poured evenly over bladder 30 or skin 60 and glass cloth layed over that. Then more resin might be poured evenly over the glass cloth and etc.

Figure 5:
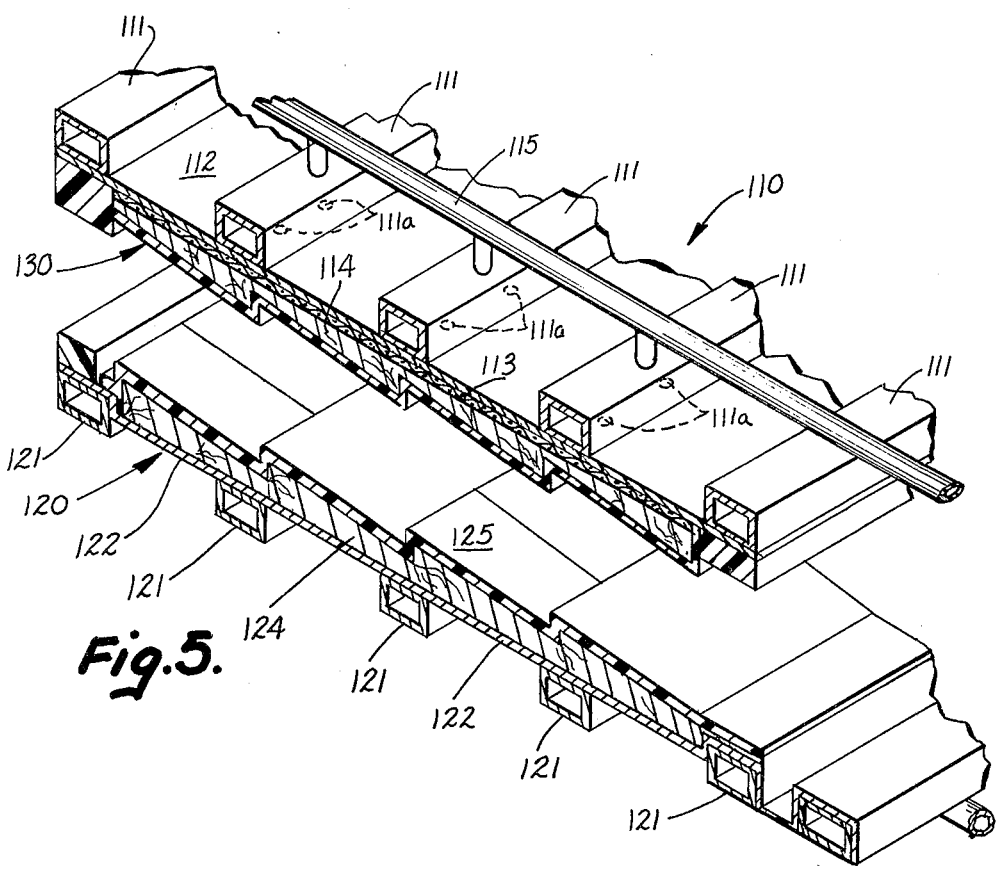
FIG. 5 is a fragmentary, perspective view of an alternative embodiment mold embodying the broader aspects of this invention and employing a resin formed molding surface.
Figure 6:
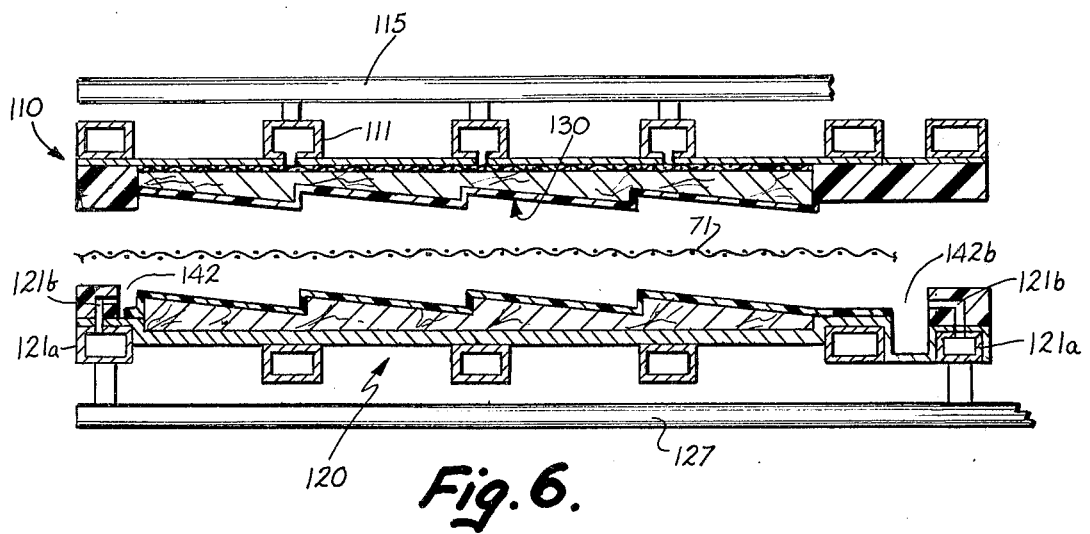
FIG. 6 is a cross-sectional view of the alternative embodiment molding apparatus in its open position.

FIG. 5 discloses an alternative embodiment mold. As shown, it is contemplated that no acrylic skin, jel coat or any other type of film would be employed, but that the resin would be cast directly against one of the mold surfaces. As shown, the alternative embodiment mold is designed to create roofing panels which simulate cedar shakes or the like.

The alternative embodiment includes a mold half 110 to which a flexible bladder 130 is secured in the same manner that flexible bladder 30 is secured to mold half 10 in the FIG. 1. Mold half 110 comprises a plurality of hollow steel tubes 111 of generally rectangular cross section which are welded to a sheet of steel 112. The mold is given a rigid configured surface conforming generally to the shape desired for the object being molded by way of a layer of wood 114 cut generally to the shape of the roofing panel. Flexible bladder 130 is layed up over the configurated surface 114. The configurated layer 114 includes a plurality of apertures therethrough so that a vacuum can be drawn on flexible bladder 130.

Between the wood layer 114 and steel sheet 112 is a layer of fiberglass cloth 113. The fiberglass cloth allows air to communicate from the passageways through configured wood layer 114 to and through the openings 111a within hollow tubes 111 which extend through the bottom of hollow tubes 111 and through metal sheet 112. A vacuum manifold 115 then connects all of the hollow metal tubes 111. When one draws a vacuum through manifold 115, that vacuum is transmitted through holes 111a, through the fiberglass cloth layer 113 and through the holes in configurated wooden layer 114 so that flexible bladder 130 is drawn tightly against configurated wooden layer 114.

The other mold half 130 also comprises a plurality of rectangular steel tubes 121 welded to a steel backing sheet 122 in much the same way as are tubes 111 welded to backing sheet 112. Then a configurated wooden member 124 whose surface corresponds generally to the shape of the object to be molded is secured in a conventional manner directly to steel backing layer 122. There is no need for any intermediate air permeable layer since there is no need to apply a vacuum on this mold half. The wooden layer 124 is covered with a rubber or other resinous material which is then imprinted with the configuration which is desired for the object to be molded. In this case, a cedar shake panel would be impressed against the resinous or rubber layer 125 and the resinous or rubber layer would then be allowed to set. Naturally, a release agent would be used on the surface of the cedar shake panel. The panel would then be removed and resinous or rubber layer 125 would have the desired roofing configuration.

A vacuum manifold 127 is provided solely for drawing a vacuum at the edges of the mold through the end edge passageways 121a. Manifold 127 thus draws a vacuum through passageway 121b which opens into the space between the two mold halfs 110 and 120. More specifically, passageways 121b open into a peripheral channel 142 which extends around the perimeter of mold member 120 and which communicates with the space between the two mold halfs.

The mold halfs 110 and 120 are sealed at their peripheral edge by sealing gaskets 140 and 141. These are rubber members adhered to their respective mold halves. The bottom gasket member 140 defines the outer wall of peripheral channel 142.

Figure 7:
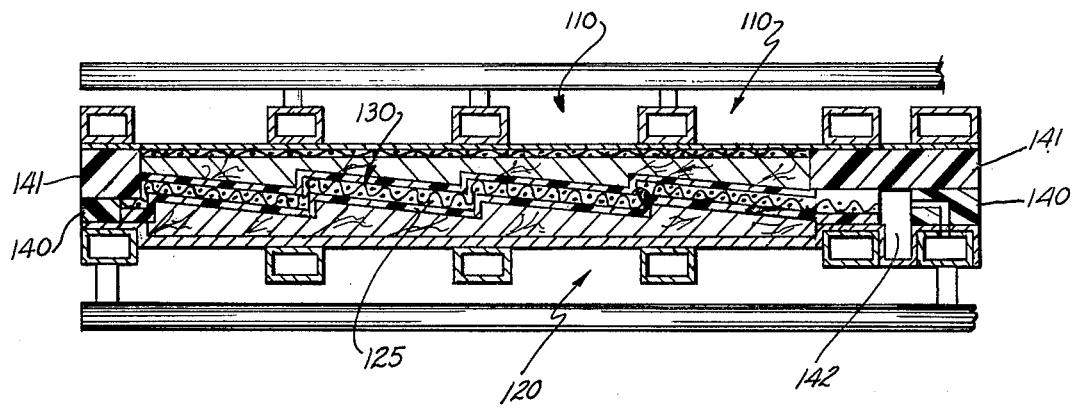
FIG. 7 is a cross-sectional view of a molding apparatus closed.
Figure 8:
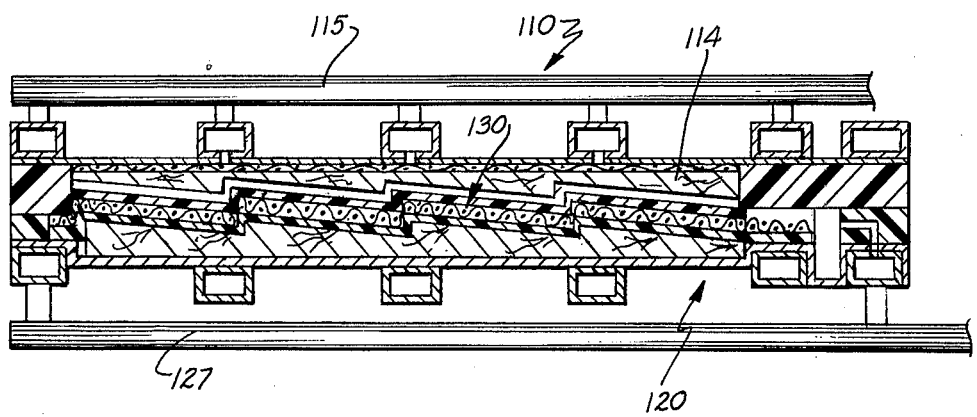
FIG. 8 is a cross-sectional view of the molding apparatus closed after the vacuum between the bladder and the bladder receiving mold half has been released.

The operation of the molds of FIGS. 5-8 is comparable to the operation of the mold of FIGS. 1-14. First, a vacuum is drawn in mold half 110 so as to draw bladder 130 tightly against the configurated mold surface defined by wooden layer 114 (FIG. 5). Then, a fiberglass sheet 71 is placed between the two mold halves against mold half 120 (FIG. 6) and resin material is poured onto it. The two mold halves are then closed as shown in FIG. 7 so as to sandwich resin and glass between the rubber molding surface defined by layer 125 and the flexible bladder 130. Vacuum is drawn through vacuum manifold 127 and thence into the space between the mold half. This draws air bubbles out of the resin layer. Excess resin is sucked into peripheral channel 142 in much the same manner as excess resin is sucked into channel 42 in the mold of FIGS. 1-4. After that vacuum has been maintained for about 5 to 25 seconds as hereinabove discussed, the vacuum through manifold 115 to bladder 130 is released. Manifold 115 is opened to the atmosphere or to a source of positive pressure and as a result, it compresses against the resin and glass layer as shown in FIG. 8. FIG. 8 reveals the space between flexible bladder 130 and wooden layer 114. At the same time, the vacuum continues to be maintained through vacuum manifold 127.

Once the panel is cured, the vacuum through manifold 127 is cut off and the vacuum through manifold 115 is reinstated. The mold members 110 and 120 are separated and the finished part is removed.

Of course, it will be understood by those skilled in the art that the above and other variations of the process can be practiced without departing from the spirit and broader aspects of the invention as set forth in the appended claims, which are to be interpreted in accordance with the prior art and the principles of the doctrine of equivalents.

The embodiments of the invention in which an exclusive property or privilege is claimed are defined as follows:

1. A method for molding plastic articles comprising:
providing male and female mold halves wherein the configuration of the male core and the female cavity correspond generally to the configuration desired for the opposing surfaces of the article to be formed;
locating a flexible bladder over one of said male mold core or said female mold cavity, said bladder having a configuration corresponding to that desired for the surface of the article which is to be formed against said one of said male core or said female cavity;
drawing a vacuum between said bladder and its adjacent mold half to hold said bladder in place;
applying a layer of resin over one of said bladder or the other of said male mold core or female mold cavity;
closing said male and female mold halves;
drawing a vacuum between said bladder and said other of said mold members while simultaneously maintaining said vacuum between said bladder and its respective adjacent mold half to thereby draw air out of said resin layer;
followed by releasing said vacuum between said bladder and its respective mold and opening the space between said bladder and its said mold half to a positive pressure relative to the vacuum being drawn between said bladder and said other mold member, while simultaneously maintaining said vacuum between said bladder and said other mold member to thereby cause said bladder to compress against said resin layer and to force some against said other mold member;
followed by curing said article, opening said mold halves and removing said article from said mold.

2. The method of claim 1 wherein: said step of providing said bladder comprises coating said one of said male mold core or said female mold cavity with a liquid rubber product which cures to form a flexible membrane.

3. The method of claim 2 which includes: incorporating into said liquid rubber coating a stretchable cloth material.

4. The method of claim 2 which includes: providing undercuts in the configuration of said bladder to thereby form undercuts in the article being molded, said step of forming said undercuts comprising applying temporary dummy ribs to said one of said mold core or said mold cavity at appropriate locations, followed by said coating step, followed by removing said bladder from its respective one of said molds, followed by removing said temporary dummy ribs from said one of said mold halves.

5. The method of claim 1 which includes: providing undercuts in said bladder, but not in the surface of its respective mold half, to facilitate the formation of undercuts in said article being molded.

6. The method of claim 1, 2, 3, 4 or 5 which includes providing rib receiving depressions in one of said male mold core or said female mold cavity; and placing reinforcing ribs on said one of said bladder and said other mold member during said step of applying said resin layer, and locating said ribs such that they will be within said rib receiving depressions when said male and female molds are closed against one another.

7. The method of claim 1, 2, 3, 4 or 5 which includes placing a surface plastic film defining the configuration of one surface of the article to be molded in said other of said male mold core or said female mold cavity prior to applying said resin layer.

8. A method for molding plastic articles comprising:
providing male and female mold halves wherein the configuration of at least one of the male core and the female cavity correspond generally to the configuration desired for the corresponding surface of the article to be formed;
locating a flexible bladder over the other of said male mold core or said female mold cavity;
drawing a vacuum between said bladder and its adjacent mold half to hold said bladder in place;
applying a layer of resin over one of said bladder or the opposite mold half;
closing said male and female mold halves;
drawing a vacuum between said bladder and said opposite mold half while simultaneously maintaining said vacuum between said bladder and its respective adjacent mold half to thereby draw air out of the space between said resin layer and said opposite mold half;
followed by releasing said vacuum between said bladder and its respective mold and opening the space between said bladder and its said mold half to a positive pressure relative to the vacuum being drawn between said bladder and said opposite mold half while simultaneously maintaining said vacuum between said bladder and said opposite mold half to thereby cause said bladder to compress against said resin layer and to force same against said opposite mold half;
followed by curing said article, opening said mold halves and removing said article from said mold.

9. The method of claim 8 wherein: said step of providing said bladder comprises coating said one of said male mold core or said female mold cavity with a liquid rubber product which cures to form a flexible membrane.

10. The method of claim 9 which includes: incorporating into said liquid rubber coating a stretchable cloth material.

11. The method of claim 9 which includes: providing undercuts in the configuration of said bladder to thereby form undercuts in the article being molded, said step of forming said undercuts comprising applying temporary dummy ribs to said one of said mold core or said mold cavity at appropriate locations, followed by said coating step, followed by removing said bladder from its respective one of said molds, followed by removing said temporary dummy ribs from said one of said mold halves.

12. The method of claim 8 which includes: providing undercuts in said bladder, but not in the surface of its respective mold half, to facilitate the formation of undercuts in said article being molded.

13. The method of claim 8, 9, 10, 11 or 12 which includes placing a surface plastic film defining the configuration of one surface of the article to be molded in said other of said male mold core or said female mold cavity prior to applying said resin layer.

14. A mold for use in molding plastic articles comprising:
male and female mold halves wherein the configuration of the male core and the female cavity correspond generally to the configuration desired for the opposing surfaces of the article to be formed;
a flexible bladder over one of said male mold core or said female mold cavity, said bladder having a configuration corresponding to that desired for the surface of the article which is to be formed against said one of said male core or said female cavity;
means for drawing a vacuum between said bladder and its adjacent mold half to hold said bladder in place;
means for closing said male and female mold halves;
means for drawing a vacuum between said bladder and the opposite mold half while simultaneously maintaining said vacuum between said bladder and its respective adjacent mold to thereby draw air out of the space between said resin layer and said opposite mold half;
means for releasing said vacuum between said bladder and its respective mold and opening the space between said bladder and its said mold to a positive pressure relative to the vacuum being drawn between said bladder and said opposite mold half while simultaneously maintaining said vacuum between said bladder and said opposite mold half of thereby cause said bladder to compress against said opposite mold half.

15. The mold of claim 14 which includes: undercuts in the configuration of said bladder to thereby form undercuts in the article being molded.

16. The mold of claim 14 or 15 in which said means for drawing a vacuum between said bladder and the opposite mold half or a film located thereon includes: a channel extending generally around the perimeter of said mold, said channel communicating with the space between said molds, said channel serving not only as a vacuum passage but also as a trough for collecting excess resin which is squeezed or drawn out from between said mold halves.

17. The mold of claim 16 wherein: said mold includes sealing means located between said mold halves and extending around the perimeter thereof.

18. The mold of claim 17 wherein: each of said mold halves includes heating passages extending through the body thereof through which heating fluid can be circulated to facilitate curing of an article produced in the mold.

19. The mold of claim 18 which includes a clamping member extending around the perimeter of said mold and being secured to that one of said mold halves on which said flexible bladder is located, said flexible bladder including a perimeter portion which is clamped between said clamping member and its respective mold half.

20. The mold of claim 19 wherein said vacuum channel is formed at least in part in said clamping member.

21. The mold of claim 16 which includes a clamping member extending around the perimeter of said mold and being secured to that one of said mold halves on which said flexible bladder is located, said flexible bladder including a perimeter portion which is clamped between said clamping member and its respective mold half.

22. The mold of claim 21 wherein said vacuum channel is formed at least in part in said clamping member.

* * * * *

UNITED STATES PATENT AND TRADEMARK OFFICE
CERTIFICATE OF CORRECTION

PATENT NO. : 4,267,142
DATED : May 12, 1981
INVENTOR(S) : Jay A. Lankheet

It is certified that error appears in the above—identified patent and that said Letters Patent is hereby corrected as shown below:

Column 7, line 56:

"1-14" should be --1-4--

Column 10, line 48:

"of" should be --to--

Signed and Sealed this

Twenty-second Day of September 1981

[SEAL]

Attest:

GERALD J. MOSSINGHOFF

Attesting Officer

Commissioner of Patents and Trademarks